(12) United States Patent
Tokoro et al.

(10) Patent No.: US 8,237,327 B2
(45) Date of Patent: Aug. 7, 2012

(54) METHOD FOR DRIVING PIEZOELECTRIC ACTUATOR, PIEZOELECTRIC-ACTUATOR CONTROL CIRCUIT, AND IMAGE-STABILIZATION CONTROL CIRCUIT

(75) Inventors: Tetsuya Tokoro, Ichinomiya (JP); Yukihiko Shigeoka, Ogaki (JP); Hisao Ito, Saitama (JP); Hideo Yoshida, Saitama (JP); Takezo Nagamitsu, Saitama (JP)

(73) Assignees: Sanyo Electric Co., Ltd. (JP); Sanyo Semiconductor Co., Ltd. (JP); Fujifilm Corporation (JP)

( * ) Notice: Subject to any disclaimer, the term of this patent is extended or adjusted under 35 U.S.C. 154(b) by 205 days.

(21) Appl. No.: 12/754,030

(22) Filed: Apr. 5, 2010

(65) Prior Publication Data

US 2010/0271700 A1 Oct. 28, 2010

(30) Foreign Application Priority Data

Apr. 24, 2009 (JP) .................................. 2009-106591

(51) Int. Cl.
 *H02N 2/06* (2006.01)
(52) U.S. Cl. ........................................ 310/317; 310/328
(58) Field of Classification Search .................. 310/317, 310/323.01–323.21, 328

See application file for complete search history.

(56) References Cited

U.S. PATENT DOCUMENTS

| 5,917,267 A | 6/1999 | Miyazawa et al. |
| 2004/0251778 A1* | 12/2004 | Hoshino ........................ 310/317 |
| 2006/0082253 A1* | 4/2006 | Hara ............................. 310/317 |
| 2008/0310022 A1* | 12/2008 | Tanaka ......................... 359/507 |

FOREIGN PATENT DOCUMENTS

| JP | 9-191676 A | 7/1997 |
| JP | 3358418 B2 | 10/2002 |

* cited by examiner

*Primary Examiner* — Derek Rosenau
(74) *Attorney, Agent, or Firm* — Cantor Colburn LLP (57) ABSTRACT

Abnormal noise generated while driving a piezoelectric actuator is prevented. A pulse-generation circuit is capable of selectively generating a displacement pulse and a stationary pulse as a drive pulse for application to a piezoelectric element, the displacement pulse having a duty ratio for causing a lens to be displaced by a predetermined step width, and the stationary pulse having a duty ratio for causing the lens to remain stationary in a current position. The pulse-generation circuit controls the production of the drive pulse continuously for a plurality of times within the servo control cycle, causes the displacement pulse to be produced when the remainder of a required amount of displacement is equal to or greater than a threshold value, and causes the stationary pulse to be continuously produced until the initiation of the next servo control cycle when the remainder is less than the threshold value.

6 Claims, 5 Drawing Sheets

METHOD FOR DRIVING PIEZOELECTRIC ACTUATOR, PIEZOELECTRIC-ACTUATOR CONTROL CIRCUIT, AND IMAGE-STABILIZATION CONTROL CIRCUIT

CROSS-REFERENCE TO RELATED APPLICATION

The present application claims priority from Japanese application JP 2009-106591 filed on Apr. 24, 2009, the content of which is hereby incorporated by reference into this application.

BACKGROUND OF THE INVENTION

1. Field of the Invention

The present invention relates to a driving method and a control circuit for generating driving pulses for an impact-drive actuator in which a piezoelectric element is used, and also relates to an image-stabilization control circuit for compensating for shaking of an image-capturing device.

2. Description of the Related Art

Piezoelectric actuators that utilize the electrostriction effects of a piezoelectric element have the potential to serve as ultra-miniature actuators and have conventionally been used for, e.g., camera shake compensation and autofocus.

An impact-drive piezoelectric actuator has a drive shaft for using friction to retain an object of movement. The drive shaft is extended and retracted by a piezoelectric element. A drive circuit generates a voltage signal so that the speed of the drive shaft changes between extension and retraction; i.e., a voltage signal such that the drive shaft extends slowly and retracts rapidly, or vice versa, and the drive circuit applies the voltage signal to the piezoelectric element. During rapid movement of the drive shaft, the object of movement slides with respect to the drive shaft due to inertia and remains substantially in position. If the drive shaft is moved slowly, the position of the object of movement is displaced along with the drive shaft by static friction. The object of movement can be displaced in a specific direction with respect to the drive shaft by this extension and retraction.

This displacement can be achieved in principle by applying a voltage signal having a jagged waveform of different rising and falling times to the piezoelectric element. However, the drive signal outputted from the drive circuit need not necessarily have a jagged waveform, and it is known that the displacement described above can be obtained by adjusting the frequency or duty ratio even when the signal has a square waveform; i.e., when the signal is a pulse signal. The movement speed of the object of movement is dependent on the frequency and duty ratio of the drive pulse, and, e.g., the movement direction can be changed by inverting the duty ratio.

Japanese Patent No. 3358418 discloses a driving device for implementing a control so that at the initiation of driving, the time for which the drive-pulse signal is applied to the piezoelectric element is gradually increased, and the driving speed gradually increases; as well as for implementing a control so that the time for which the drive-pulse signal is applied to the piezoelectric element is gradually reduced, and the driving speed gradually decreases.

SUMMARY OF THE INVENTION

Conventionally, the drive pulse applied to the piezoelectric element is stopped during intervals in which the object of movement need not be displaced, and production of the drive pulse is initiated when displacement becomes necessary.

However, problems are presented in this driving method in that the piezoelectric actuator produces abnormal noise during driving. This noise occurs while driving the piezoelectric actuator when the interval during which the drive pulse may be produced a plurality of times is set to the servo control cycle. In this driving method, when the drive pulse causes the displacement of the driven object to reach the required amount of displacement midway through the servo control cycle, the drive pulse is no longer produced for the remainder of the servo control cycle. The drive pulse is once again produced at the beginning of the next servo control cycle if the object of movement must be displaced. The frequency of the drive pulse is high at, e.g., 100 kHz and exceeds the audible range. The noise therefore does not result from the drive pulse itself but is suspected to result from repeatedly moving and stopping the driven object according to the servo control cycle.

The occurrence of abnormal noise upon moving and stopping can be reduced by gradually changing the driving speed during initiation and cessation of driving. However, control must be implemented to gradually change the applied voltage or the pulse amplitude of the drive-pulse signal in order to gradually change the driving speed, and this control may be complex.

The present invention was devised in light of the aforementioned problems, and provides a driving method and a piezoelectric-actuator control circuit in which noise produced in an impact-drive piezoelectric actuator is readily minimized using simple control, and also provides an image-stabilization control circuit in which noise in the piezoelectric actuator is minimized.

The present invention is a method for driving a piezoelectric actuator, in which a drive pulse is supplied to the piezoelectric actuator, and an object of driving is displaced one step at a time in synchronization with the drive pulse, the method comprising performing stationary driving for supplying a stationary pulse as the drive pulse before initiating displacement of the object of driving, the stationary pulse having a duty ratio for causing the object of driving to remain stationary at a current position; and beginning to supply a displacement pulse as the driving pulse after the stationary driving and displacing the object of driving, the displacement pulse having a duty ratio for causing the object of driving to be displaced.

DESCRIPTION OF THE PREFERRED EMBODIMENTS

Embodiments of the present invention will be described below with reference to the drawings. The present invention is implemented in a camera in the present embodiment, and the piezoelectric actuator is used in a shake-compensation mechanism of the camera.

Figure 1:
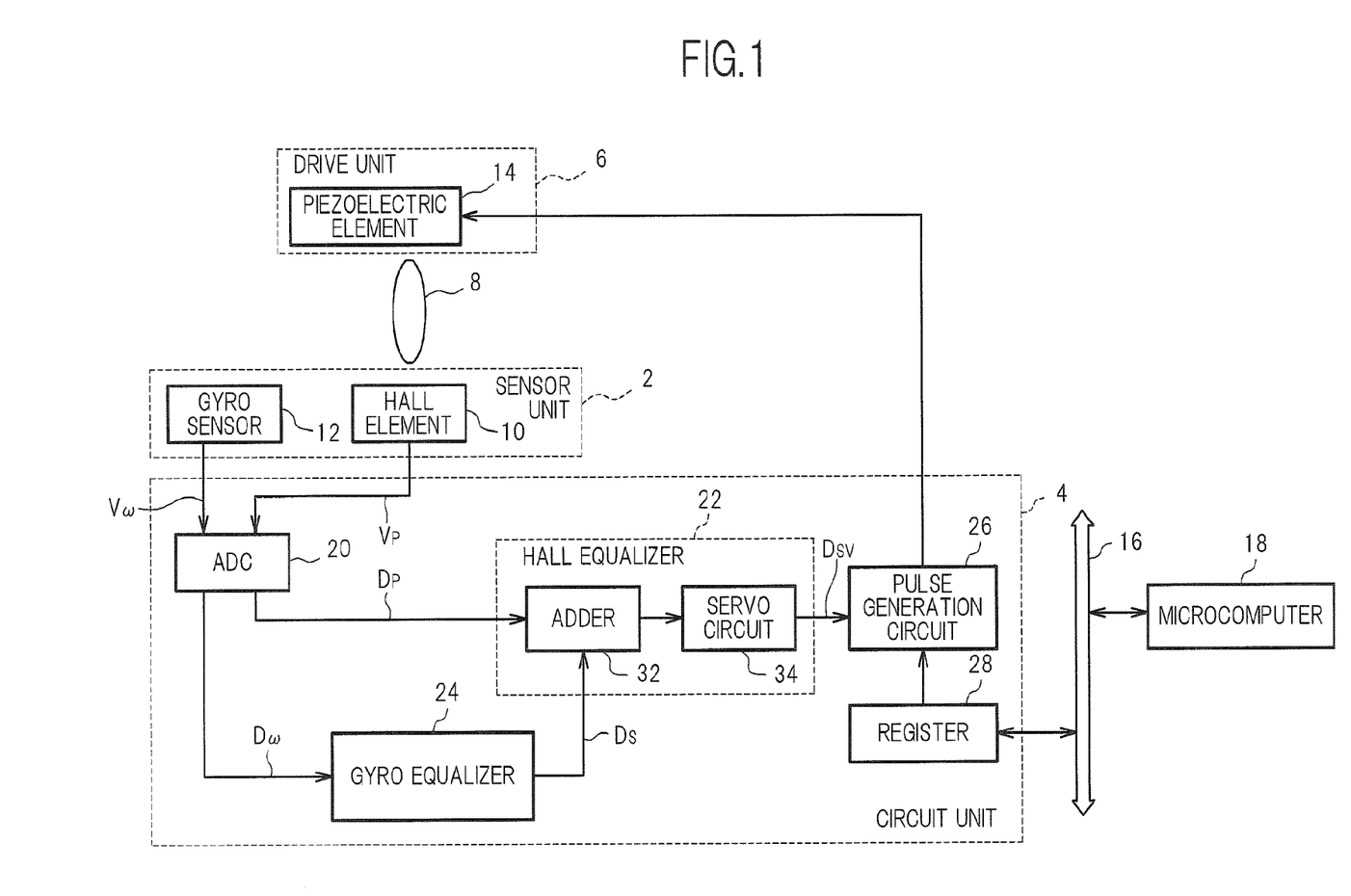
FIG. 1 is a schematic block diagram showing a shake-compensation system that uses a piezoelectric actuator according to an embodiment of the present invention.

FIG. 1 is a schematic block diagram showing a shake-compensation system, in which a piezoelectric actuator is used, in the present camera. The shake-compensation system includes a sensor unit 2, a circuit unit 4, and a drive unit 6. The circuit unit 4 is an image-stabilization control circuit for controlling shake compensation. Several schemes are employed in shake-compensation systems, and a scheme may be adopted in the present system in which, e.g., the position of a lens 8 for forming an optical image on a light-receiving surface of an imaging element (not shown) is controlled.

The sensor unit 2 comprises Hall elements 10 and gyro sensors 12. The Hall element 10 is a sensor provided to detect the position of the lens 8. The Hall element generates a voltage signal $V_P$ according to the distance from the lens 8 on the basis of the magnetic field of a magnet fixed to the lens 8 and outputs the voltage signal to the circuit unit 4. In order to detect the two-dimensional position ($P_X$, $P_Y$) of the lens 8 in the plane (x-y plane) perpendicular to the optical axis, a Hall element 10 is provided for each of the x direction and the y direction, and a signal $V_{PX}$ for the x direction and a signal $V_{PY}$ for the y direction are obtained as signals $V_P$.

The gyro sensor 12 is provided to detect vibration of the camera. The gyro sensor outputs a voltage signal $V_\omega$ that corresponds to the angular speed $\omega$ of the camera to the circuit unit 4. Two gyro sensors 12 are provided. These sensors detect the angular speed component $\omega_X$ about the x-axis and the angular speed component $\omega_Y$ about the y-axis, respectively, and output a signal $V_{\omega X}$ corresponding to $\omega_X$ and a signal $V_{\omega Y}$ corresponding to $\omega_Y$ as signals $V_\omega$.

The drive unit 6 is piezoelectric actuators of the impact-drive type described above, and comprises piezoelectric elements 14. A drive pulse signal generated by the circuit unit 4 is applied to the piezoelectric element 14, which extends and retracts to cause a drive shaft to advance and retreat, and displaces the lens 8, which is retained on the drive shaft by friction, along the drive shaft. A pair of actuators that include a piezoelectric element 14 and a drive shaft is provided in order to achieve displacement in two dimensions in the x-y plane. Displacement in both the x and y directions is possible.

The circuit unit 4 is connected to a microcomputer 18 via a system bus 16 or the like. The circuit unit 4 has an A/D converter (ADC: analog-to-digital converter) 20, a Hall equalizer 22, a gyro equalizer 24, a pulse-generation circuit 26, and a register 28. The circuit unit 4 comprises a logic circuit and, e.g., an ASIC (application-specific integrated circuit).

The output signals of the Hall element 10 and the gyro sensor 12 are each inputted to the ADC 20. The ADC 20 converts the voltage signals $V_{PX}$, $V_{PY}$ outputted by the two Hall elements 10, and the voltage signals $V_{\omega X}$, $V_{\omega Y}$ outputted by the gyro sensor 12 into digital data $D_{PX}$, $D_{PY}$, $D_{\omega X}$, $D_{\omega Y}$ in a time-divided manner. The A/D conversion of each signal is performed periodically during each servo control cycle.

The position data $D_{PX}$, $D_{PY}$ generated based on the output of the Hall elements 10 are inputted to the Hall equalizer 22. The angular speed data $D_{\omega X}$, $D_{\omega Y}$ generated based on the output of the gyro sensor 12 are inputted to the gyro equalizer 24.

The gyro equalizer 24 integrates the angular speeds $D_{\omega X}$, $D_{\omega Y}$ inputted during a predetermined sampling period for each servo control cycle and generates data $D_{\theta X}$, $D_{\theta Y}$ according to oscillation angles $\theta_X$, $\theta_Y$ of the camera about the x-axis and the y-axis, respectively. On the basis of the data $D_{\theta X}$, $D_{\theta Y}$, the gyro equalizer 24 generates and outputs vibration-amount data $D_{SX}$, $D_{SY}$ according to the amount of shake in the x direction and the y direction, respectively.

The Hall equalizer 22 has an adder 32 and a servo circuit 34. The adder 32 adds the position data $D_{PX}$, $D_{PY}$ inputted from the ADC 20 and the vibration-amount data $D_{SX}$, $D_{SY}$ inputted from the gyro equalizer 24 separately for the x and y directions. The servo circuit 34 computes servo data $D_{SVX}$, $D_{SVY}$ that are required displacement amounts of the lens 8 from the output data $D_{AX}$, $D_{AY}$ of the adder 32.

The pulse generation circuit 26 generates a pulse for driving the piezoelectric element 14 on the basis of the servo data $D_{SVX}$, $D_{SVY}$ outputted from the Hall equalizer 22. The generated drive pulse signal is amplified to a voltage adequate for driving the piezoelectric element 14 and is applied to the piezoelectric element 14. The pulse generation circuit 26 generates a pulse so that the drive unit 6 is driven in the direction in which the absolute values of $D_{SVX}$, $D_{SVY}$ decrease. A camera equipped with this system can thereby move the lens 8 according to shaking during the imaging period, compensate for displacement of the photographic subject image on the imaging element due to the shake, and obtain a high-quality image signal.

Figure 2:
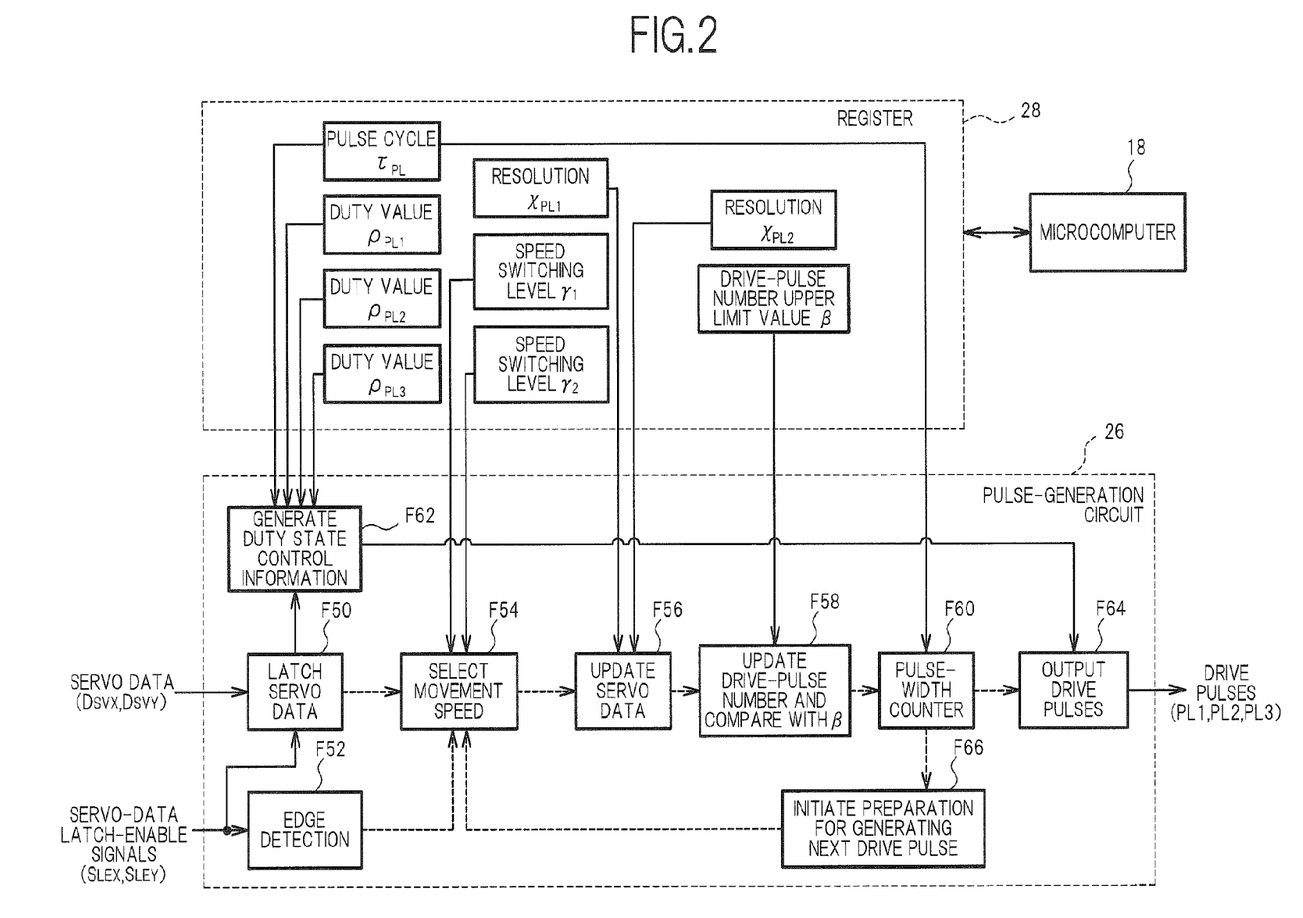
FIG. 2 is a schematic functional block diagram showing a pulse generation circuit.

FIG. 2 is a schematic functional block diagram showing the pulse generation circuit 26. The register 28 retains various types of user setting parameters used in processing by the pulse generation circuit 26. The writing and reading operations of the register 28 can be performed by the microcomputer 18 via the system bus 16. A user can execute a predetermined program in the microcomputer 18 and thereby perform a desired operation on the register 28.

The pulse generation circuit 26 in this arrangement can generate three types of drive pulses PL1, PL2, PL3 having different duty ratios. For example, in the register 28, a pulse cycle $\tau_{PL}$, of PL1, PL2, PL3 and duty values $\rho_{PL1}$, $\rho_{PL2}$, $\rho_{PL3}$ of PL1, PL2, PL3 respectively, are set as parameters for specifying the drive pulses PL1, PL2, PL3 of one cycle. The $\tau_{PT}$, can be defined by, e.g., the number of cycles of a high-speed reference clock CLK that is fed to the pulse generation circuit 26. The $\rho_{PL1}$, $\rho_{PL2}$, $\rho_{PL3}$ can be defined by the number of cycles of the clock CLK that are included in an H (High) level period of PL1, PL2, PL3 when the lens 8 is displaced in the positive directions of the x, y axes. Based on these settings, the pulse generation circuit 26, e.g., generates a pulse having the duty ratio ($\rho_{PL1}/\tau_{PL}$) in the case of displacement in the positive direction by PL1, and generates a pulse in which the time widths of the H level and the L (Low) level are reversed from that of displacement in the positive direction in the case of displacement in the negative direction. Positive and negative duties are specified in the same manner for PL2 as well. The drive pulses PL1, PL2 are displacement pulses for displacing the lens 8, whereas the drive pulse PL3 is set as a stationary pulse for holding the lens 8 in the current position. The drive pulse PL3 therefore does not need to be differentiated according to the positive and negative displacement directions of the lens 8 and can be defined using a single duty. The PL3 duty ratio ($\rho_{PL3}/\tau_{PL}$) can be set to substantially 50%.

The pulse-generation circuit 26 functions as a drive pulse-generation unit for selectively generating the displacement pulses PL1, PL2 and the stationary pulse PL3 and outputting to the drive unit 6, as described above. The generation of PL1, PL2, PL3 is switched according to the size of the servo data. Speed switching levels $\gamma_1$, $\gamma_2$ are stored in the register 28 in advance as threshold values for determining the size.

The lens 8 is displaced one step for each cycle when PL1, PL2 are generated. The displacement step width is the resolution with which the position of the lens 8 is controlled. An expected value can be calculated for the step width through prior measurements or the like. The expected value is stored in the register 28 in advance as resolutions $\chi_{PL1}, \chi_{PL2}$ of PL1, PL2. The register 28 thus functions as a step-width storage unit. The resolutions $\chi_{PL1}, \chi_{PL2}$ stored in the register 28 are digital data that are expressed in the same number of bits as the speed switching levels $\gamma_1, \gamma_2$. In this instance, duty values $\rho_{PL1}, \rho_{PL2}$ are set so that the lens 8 can be moved faster by PL1 than by PL2, and $\chi_{PL1} > \chi_{PL2} > 0$ according to this speed difference.

An upper limit value $\beta$ of the number of drive pulses that can be generated in a servo control cycle may also be set in advance in the register 28.

Various types of parameters are thus stored in advance in the register 28. These parameters may be set separately for the x-axis and the y-axis. The pulse generation circuit 26 operates using these various parameters.

A servo-data latch-enable signal $S_{LE}$ generated in synchrony with the servo control cycle is inputted to the pulse generation circuit 26. When the signal $S_{LE}$ rises, the pulse generation circuit 26 performs an operation for latching the servo data outputted by the servo circuit 34 (F50). Since the circuit unit 4 performs x-direction servo control and y-direction servo control by time division, a signal $S_{LEX}$ for the x-direction and a signal $S_{LEY}$ for the y-direction are generated separately as signals $S_{LE}$ at mutually offset timings. The circuit unit 4, e.g., acquires the output of the Hall element 10 and the gyro sensor 12 in relation to the x-direction, generates the servo data $D_{SVX}$, and outputs the $S_{LEX}$. The circuit unit 4 also acquires the output of the Hall element 10 and gyro sensor 12 in relation to the y-direction, generates the servo data $D_{SVY}$, and outputs the $S_{LEY}$.

When the falling edges of the signals $S_{LEX}, S_{LEY}$ are detected in the pulse generation circuit 26 (F52), the process from F54 to F64 is initiated for generating a drive pulse for the piezoelectric element 14.

The pulse generation circuit 26 compares the absolute values of the servo data $D_{SVX}, D_{SVY}$ to the predetermined speed switching levels $\gamma_1, \gamma_2$, determines which of PL1, PL2, PL3 to generate according to the comparison results, and selects a movement speed (F54). The type of the selected pulse is set in a speed flag $F_{SP}$. The pulse-generation circuit 26 thus functions as a control unit for comparing the current servo data $D_{SVX}, D_{SVY}$, which represents the remaining amount of required displacement of the lens 8, to the threshold values $\gamma_1, \gamma_2$, and specifies the produced drive pulses to a drive-pulse pulse generation unit contained in the pulse-generation circuit 26.

The pulse generation circuit 26 updates the servo data $D_{SVX}, D_{SVY}$ according to the displacement of the lens 8 by the drive pulses PL1, PL2 and controls generation of the drive pulses so that the servo data $D_{SVX}, D_{SVY}$ approach zero. Specifically, when PL1 or PL2 is selected as the drive pulse in F54, the pulse generation circuit 26 updates the servo data to values subsequent to drive pulse generation (F56) using the resolution ($\chi_{PL1}$ or $\chi_{PL2}$) that corresponds to the selected drive pulse. The servo data $D_{SVX}, D_{SVY}$ is maintained at the current value when the drive pulse selected in process F54 is PL3.

The pulse generation circuit 26 monitors the progress of time during the current servo control cycle and continues to generate a drive pulse until no time remains to generate the next drive pulse during the current servo control cycle. The progress of time during the servo control cycle can be apprehended on the basis of, e.g., the number of times a drive pulse is generated during the servo control cycle. The pulse-generation circuit 26 in this instance counts the number of times that a drive pulse is generated, compares the number of generations $n_{PL}$ to the upper limit value $\beta$ thereof, and makes a judgment as to whether or not the next drive pulse to be generated will be the last in the current servo control cycle (F58).

The pulse-width counter initiates the count of the reference clock CLK in conjunction with the initiation of one cycle drive-pulse generation (F60). The timing of drive pulse generation and the like is controlled based on a count value $n_{CLK}$ thereof.

The positive/negative sign of the direction in which the lens 8 is to be moved is detected according to the sign of the latched servo data. The length of the H, L level, or the switching timing of the H, L level, which act as control information for the duty state of one cycle of drive pulses, is calculated as a number of cycles of the reference clock CLK from the sign, the pulse cycle $\tau_{PL}$, and duty value ($\rho_{PL1}, \rho_{PL2}, \rho_{PL3}$) stored in the register 28 (F62). The pulse generation circuit 26 generates and outputs the drive pulse on the basis of the reference clock CLK count value $n_{CLK}$ and the duty state control information for whichever of PL1, PL2, PL3 is specified by the speed flag $F_{SP}$ (F64).

Preparation for generating a drive pulse is initiated slightly before $n_{CLK}$ reaches $\tau_{PL}$, so that the cycle of the next drive pulse can begin immediately following the end ($n_{CLK} = \tau_{PL}$) of the cycle of the drive pulse currently being outputted (F66).

In FIG. 2, the primary function of the pulse-generation circuit 26 when acting as a control unit corresponds to block F54, and the primary function when acting as a pulse-generation unit corresponds to blocks F60, F64. Although the operation of the pulse generation circuit 26 that is configured from an ASIC is substantially preset, the user can cause an actuator to operate according to a specific purpose by adjusting the various parameters stored in the register 28. This configuration makes it possible to reduce the burden on the microcomputer and easily utilize a piezoelectric actuator in comparison to the conventional method, in which a microcomputer controls the operation of the actuator using firmware for controlling a piezoelectric actuator.

Figure 3:
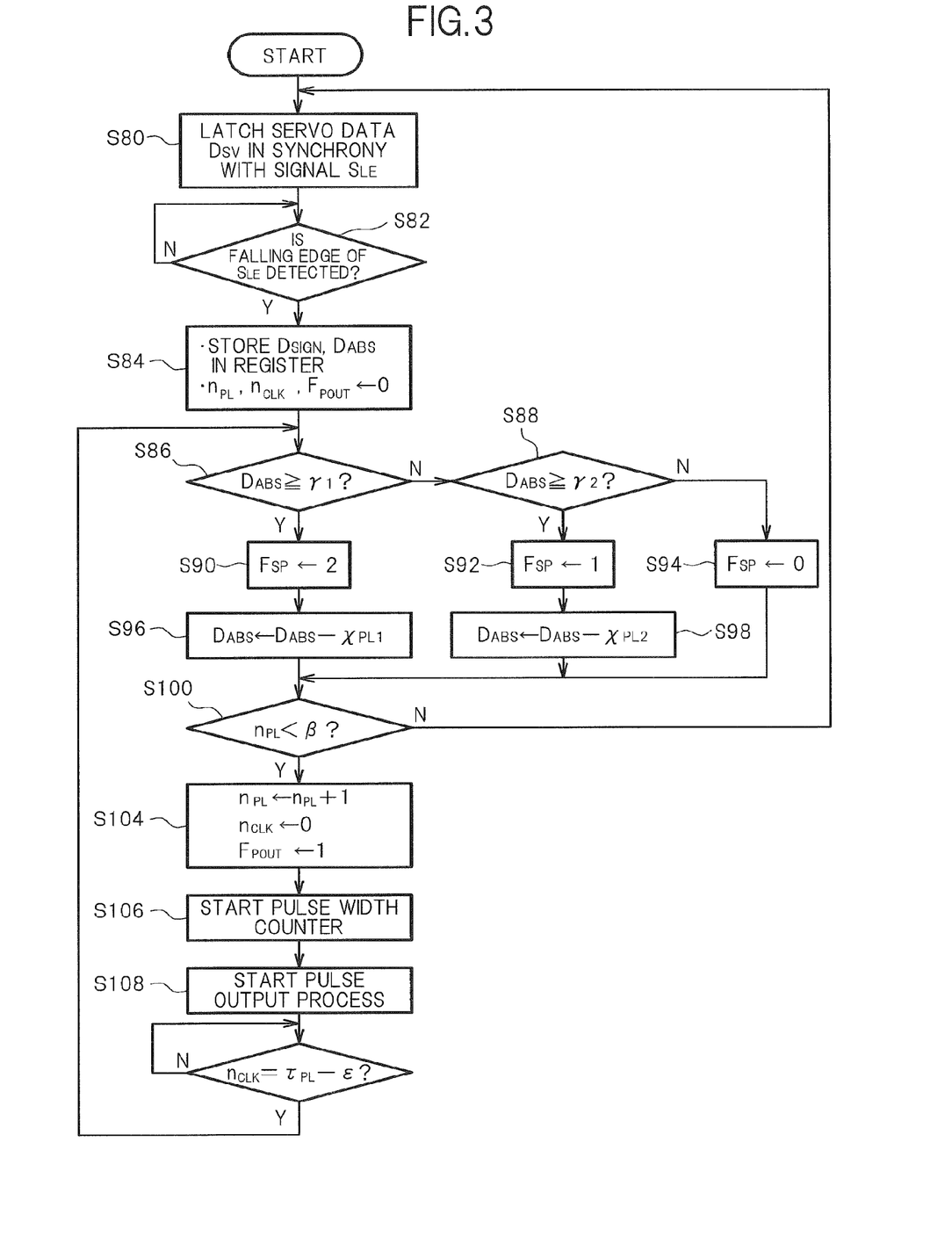
FIG. 3 is a schematic flow chart showing the process for generating a drive pulse using the pulse generation circuit.

FIG. 3 is a schematic flow chart showing the process for generating a drive pulse using the pulse generation circuit 26. The servo data $D_{SV}$ ($D_{SVX}, D_{SVY}$) are latched in synchrony with the servo-data latch-enable signal $S_{LE}$ (S80; F50 of FIG. 2). When the pulse generation circuit 26 detects the falling of the $S_{LE}$ (S82; F52 of FIG. 2), the pulse generation circuit 26 stores a value $D_{SIGN}$ of the $D_{SV}$ sign bit and the absolute value $D_{ABS}$ of the $D_{SV}$ in the register (S84). The count value $n_{PL}$ for the number of drive pulses that have been outputted, the count value $n_{CLK}$ of the pulse width counter, and a pulse output flag $F_{POUT}$ are reset to zero (S84).

The pulse generation circuit 26 compares the absolute value $D_{ABS}$ of the servo data to the speed switching levels $\gamma_1$. When $D_{ABS} \geq \gamma_1$, PL1, which produces a larger displacement (coarser movement) than PL2, is selected (S86). When $\gamma_1 > D_{ABS} \geq \gamma_2$, PL2, which produces a smaller displacement (finer movement) than PL1, is selected, and when $\gamma_2 > D_{ABS}$, PL3, which causes the lens 8 to remain stationary in the current position, is selected (S88). Specifically, the speed flag $F_{SP}$ is set according to this selection, such that $F_{SP}=2$ when $D_{ABS} \geq \gamma_1$ (S90), $F_{SP}=1$ when $\gamma_1 > D_{ABS} \geq \gamma_2$ (S92), and $F_{SP}=0$ when $\gamma_2 > D_{ABS}$ (S94; F54 of FIG. 2).

When $F_{SP}=2$, PL1 is assumed to be generated, and $D_{ABS}$ is calculated thereafter. Specifically, $D_{ABS}$ is updated using a value resulting from subtracting $\chi_{PL1}$ from the current $D_{ABS}$ (S96; F56 in FIG. 2). In order to avoid situations where the updated $D_{ABS}$ is less than 0, and the target position is exceeded, $\gamma_1$ is set in a range such that $\gamma_1 \geq \chi_{PL1}$.

When $F_{SP}=1$, PL2 is assumed to be generated, and $D_{ABS}$ is calculated thereafter. Specifically, $D_{ABS}$ is updated using a value resulting from subtracting $\chi_{PL2}$ from the current $D_{ABS}$ (S98; F56 in FIG. 2). When avoiding situations where the updated $D_{ABS}$ is less than 0, and the lens 8 is stopped at position exceeding the target position, $\gamma_2$ is set in a range such that $\gamma_2 \geqq \chi_{PL2}$. If $\gamma_2$ is set to equal $\chi_{PL2}$ in this instance, a distance $\Delta$ between the stopping position and the target position of the lens 8 is such that $0 \leqq \Delta \leqq \chi_{PL2}-1$, and the stopping position of the lens 8 can approach the target position in the most appropriate manner. However, if the lens 8 exceeding the target position is not considered a problem, $\gamma_2$ is lowered to $(\chi_{PL2}+1)/2$ when $\chi_{PL2}$ is odd and is lowered to $\chi_{PL2}/2$ when $\chi_{PL2}$ is even, whereby the upper limit of $\Delta$ can be reduced to approximately $\chi_{PL2}/2$.

When $F_{SP}=0$, PL3 is generated. The generation of PL3 does not change the $D_{ABS}$ before or after (F56 of FIG. 2).

From the standpoint of the distance $\Delta$ after a drive pulse has been generated, leeway exists for generating the pulse selected from PL1, PL2, PL3 by the aforedescribed comparison process (S86, S88). A determination is then made as to whether the number of drive pulses will exceed the upper limit value $\beta$ even if the selected drive pulse is generated (S100; F58 of FIG. 2). Specifically, if the count value $n_{PL}$ of pulses that have been outputted at the current time has reached the upper limit value $\beta$; i.e., if $n_{PL} \geqq \beta$, the process is stopped for the current servo control cycle, and the system waits for the initiation of the next servo control cycle (S80).

When $n_{PL} < \beta$, the process proceeds to outputting the drive pulse selected by the comparison process (S86, S88). At the start of the pulse outputting process, the count value $n_{PL}$ of pulses that have been outputted is incremented by 1, and the count value $n_{CLK}$ of the pulse-width counter is reset to zero (S104). The pulse output flag $F_{POUT}$ is also set to one (S104). The pulse-width counter is then started (S106). The pulse outputting process is started in conjunction with setting the pulse output flag $F_{POUT}$ to one (S108). The operation of the pulse width counter and the pulse-outputting process can both be executed in the pulse generation circuit 26 in parallel with the aforedescribed preparation processes S86 through S100 prior to generating the drive pulse. When the value $n_{CLK}$ of the pulse width counter reaches a value $(\tau_{PL}-\epsilon)$ immediately prior to the end of counting (S110), the preparation processes S86 through S100 for the subsequent drive pulse are initiated while generation of the current drive pulse is continued (S110; F66 of FIG. 2). The value of $\epsilon$ is set according to the time required for the preparation processes S86 through S100, and is set to, e.g., approximately 2. The pulse width counter counts the reference clock CLK, as described above.

In the pulse outputting process, information for controlling the duty state of the drive pulse is generated from the sign bit value $D_{SIGN}$, the speed flag $F_{SP}$, the duty values $\rho_{PL1}$, $\rho_{PL2}$, $\rho_{PL3}$, and the pulse cycle $\tau_{PL}$ (F62 in FIG. 2). The pulse generation circuit 26 switches between the H level and the L level of the output voltage on the basis of the $n_{CLK}$ and the control information for determining the duty, and generates and outputs a drive pulse.

Figure 4:
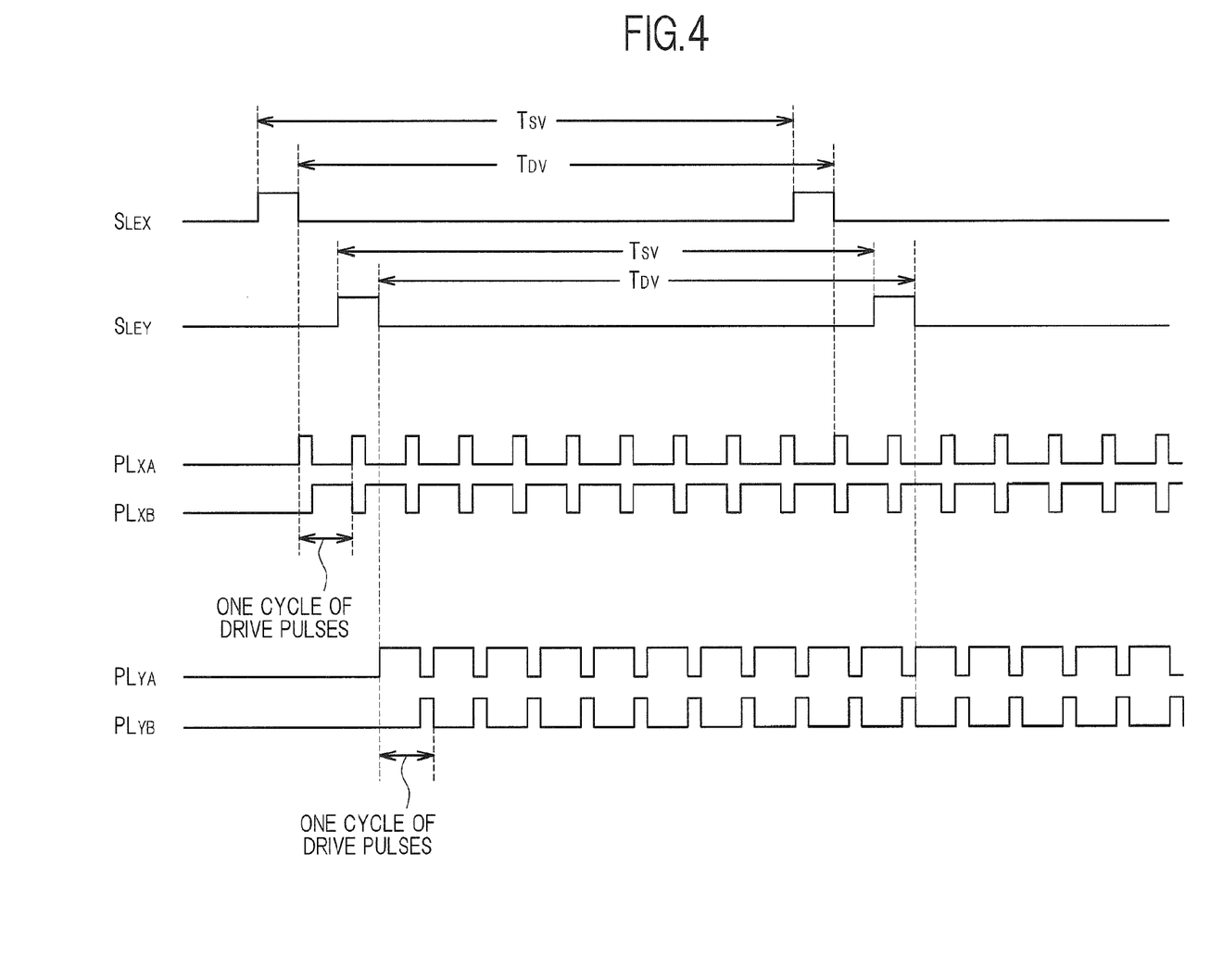
FIG. 4 is a schematic timing diagram showing the signal waveform of the drive pulses.

FIG. 4 is a timing chart that schematically shows the signal waveform of the drive pulses. In FIG. 4, the time axis is in the horizontal direction, and the servo-data latch-enable signals $S_{LEX}$, $S_{LEY}$ drive pulses $PL_{XA}$, $PL_{XB}$ for the x-direction piezoelectric actuator, and drive pulses $PL_{YA}$, $PL_{YB}$ for the y-direction piezoelectric actuator are arranged and indicated in the vertical direction. The pulses $PL_{XA}$ and $PL_{XB}$ are pulses applied to both terminals, respectively, of the piezoelectric element 14 of the x-direction actuator, and are substantially mutually complementary waveforms. In the same manner, pulses $PL_{YA}$ and $PL_{YB}$ are pulses applied to both terminals, respectively, of the piezoelectric element 14 of the y-direction actuator. For, e.g., the x direction, a servo control cycle $T_{SV}$ is the interval of the rising timing of $S_{LEX}$, and the drive pulses $PL_{XA}$, $PL_{XB}$ that are based on control during the servo control cycle can be generated during an interval $T_{DV}$ of the falling timing of $S_{LEX}$. The maximum value of the number of drive pulses that can be generated in $T_{DV}$ is specified as $\beta$. The value of $\beta$ is set so as to satisfy $\beta \leqq T_{DV}/(T_{CLK} \cdot \tau_{PL})$, where $T_{CLK}$ is the length of one cycle of the reference clock CLK.

FIG. 4 shows a state in which $\beta$ has been set to $T_{DV}/(T_{CLK} \cdot \tau_{PL})$. In this setting, the first cycle of drive pulses corresponding to the next servo control cycle begins at the same time that the last cycle of drive pulses corresponding to a given servo control cycle ends. In other words, a drive pulse is constantly applied to the piezoelectric element 14 during a set cycle. The driving of the lens 8 during boundary portions of the servo control cycle is smoothed, and the production of noise by the drive unit 6 or the lens 8 is reduced.

Figure 5:
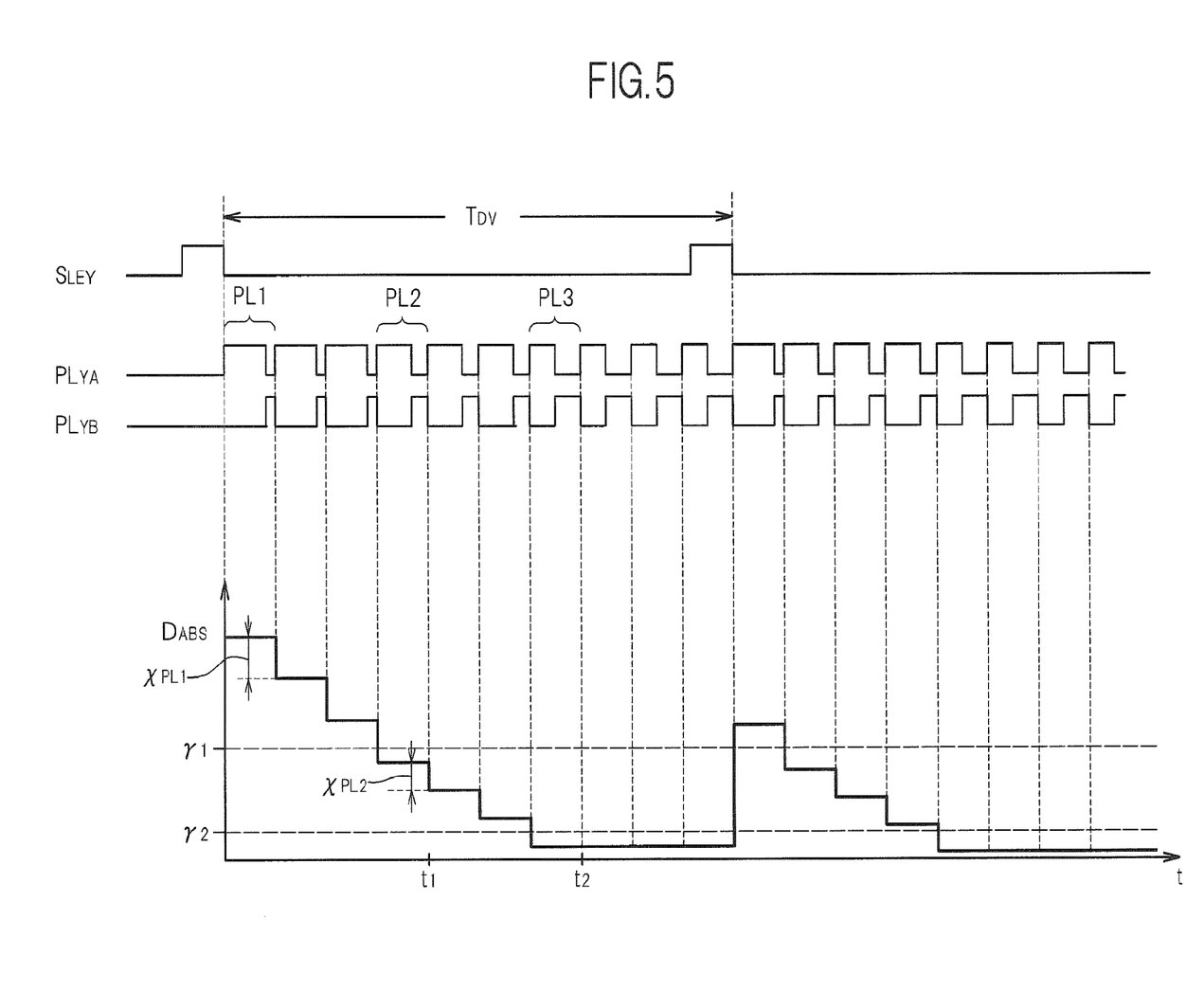
FIG. 5 is a schematic timing diagram showing an example of servo control using a piezoelectric actuator.

FIG. 5 is a schematic timing diagram showing an example of servo control using a piezoelectric actuator. In FIG. 5, the time axis is in the horizontal direction, and the servo-data latch-enable signal $S_{LEY}$, the drive pulses $PL_{YA}$, $PL_{YB}$, and the absolute value $D_{ABS}$ of the servo data $D_{SVY}$ are arranged and indicated in the vertical direction. This example is of a case in which the absolute value of $D_{SVY}$ latched in the falling of $S_{LEY}$ is larger than the speed switching level $\gamma_1$. The value of $D_{ABS}$ is reduced by a predetermined step width each time a drive pulse occurs, and gradually approaches zero, which corresponds to the target position of the lens 8. At the start of driving, $D_{ABS}$ is larger than $\gamma_1$, and generation of the drive pulse PL1 is selected in process S86. The lens 8 is thereby displaced by a relatively large step width. This step width corresponds substantially to the expected value set in the register 28 as the resolution $\chi_{PL1}$, and $D_{ABS}$ is updated to a value that is lessened by an amount of $\chi_{PL1}$. Generation of the drive pulse PL1 is repeated while $D_{ABS}$ is larger than $\gamma_1$.

When $D_{ABS}$ is less than $\gamma_1$, generation of the drive pulse PL2 is selected in processes S86, S88, and the lens 8 is displaced by a step width smaller than that of PL1 (time $t_1$). The step width of PL2 corresponds substantially to the expected value set in the register 28 as the resolution $\chi_{PL2}$, and $D_{ABS}$ is updated to value lessened by $\chi_{PL2}$.

When $D_{ABS}$ is less than $\gamma_2$, generation of the drive pulse PL3 is selected in processes S86, S88, and the lens 8 is held stationary in the current position (time $t_2$). The stationary pulse PL3 continues to be generated until the initiation of the next servo control cycle. In other words, stationary driving is performed for supplying the stationary pulse PL3 to the piezoelectric element 14 as the drive pulse in advance of beginning Lo displace the lens 8 during the next servo control cycle, and the supply of the displacement pulse PL1 or PL2 during the next servo control cycle is performed directly after this stationary driving. The lens 8 is held in the current position while being subjected to minute vibrations at that position during stationary driving. When the lens 8 is displaced from this state, the frictional force acting between the lens 8 and the drive shaft that uses friction to retain the lens becomes kinetic frictional force. In contrast, static frictional force is in effect at the initiation of displacement in conventional methods in which a stationary pulse is not produced in advance of the generation of a displacement pulse. Because kinetic frictional force is weaker than static frictional force, in the driving method according to the present invention, displacement can be initiated more smoothly than in the prior art, and this smooth initiation reduces noise.

The pulse generation circuit 26 can thus switch between a coarse-movement operation for displacing the lens 8 by a large step width using PL1, and a fine-movement operation for displacing the lens 8 by a small step width using PL2. The coarse-movement operation can thereby be used to cause the lens to rapidly approach the target position using a number of drive pulses that is limited within a period $T_{DV}$, which corresponds to the servo control cycle, even when $D_{ABS}$ is large. Although the speed at which the target position is approached is reduced by the fine movement operation, suitable positional accuracy can be obtained.

In particular, as described above, switching is performed as $D_{ABS}$ gradually approaches zero so that coarse movement is performed while $D_{ABS}$ is in a large range, and fine movement is performed while $D_{ABS}$ is in a small range, whereby the time taken to reach the target position can be shortened, and the accuracy of the position reached can be simultaneously maintained.

The present invention can also be used in an image-stabilization system for using a piezoelectric actuator to displace an imaging element instead of the lens 8. The embodiment described above relates to an image-stabilization system, but the present invention can be applied generally to a circuit for driving a piezoelectric actuator used in an autofocus or other servo control system.

In the example given in the embodiment described above, a stationary pulse was continuously produced for the stationary period of the object of movement during each servo control cycle, where this period was in alternation with the period for displacing the object of movement. However, noise is minimized even when the stationary pulse is produced for only the period of the portion directly before the generation of the displacement pulse instead of the entirety of the stationary period. The driving method of the present invention can also be applied to the driving of other instances of servo control.

In the embodiment described above, the drive unit 6 was implemented as a piezoelectric actuator in which the piezoelectric element 14 was employed, but the drive unit 6 may also be configured such that another electromechanical transducing element having the same function as the piezoelectric element; i.e., expansion and contraction according to an electrical signal, is used instead of the piezoelectric element 14. The present invention can also be applied to methods for driving actuators and control circuits in which such electromechanical transducing elements are employed, and abnormal noises as described above can be minimized in the embodiment described above.

According to the present invention, stationary operation is in progress at the initiation of displacement of the object of movement, and displacement begins from this state. During stationary driving, the piezoelectric actuator is expanded and contracted while the object of movement is held in a stopping position. In other words, the object of movement is macroscopically in a stopped state but is microscopically in a state of minute vibration in the vicinity of the stopping position, and it is inferred that in this vibrating state the piezoelectric actuator uses kinetic frictional force to retain object of movement. Kinetic frictional force is weaker than static frictional force, and therefore displacement of the object of movement from the stopped state can be more smoothly initiated according to the present invention. Abnormal noises resulting from such operations are minimized in the present invention. The necessary driving pulses are of substantially two types; i.e., stationary pulses and displacement pulses, in order to minimize the occurrence of these abnormal noises. The control is simple in that the duty ratios of the driving pulses need not be more precisely modified upon the initiation of driving. A simple configuration is also possible for the control circuit.

What is claimed is:

1. A piezoelectric-actuator control circuit for using a piezoelectric actuator to control a displacement of an object of driving on the basis of a required amount of displacement of the object of driving, the amount being obtained for each of predetermined servo control cycles, the piezoelectric-actuator control circuit comprising:
a drive-pulse generation unit for selectively generating and outputting to the piezoelectric actuator a displacement pulse and a stationary pulse as a drive pulse for application to a piezoelectric element of the piezoelectric actuator, the displacement pulse having a duty ratio for causing the object of driving to be displaced by a predetermined step width, and the stationary pulse having a duty ratio for causing the object of driving to remain stationary in a current position; and
a control unit for causing the drive-pulse generation unit to produce the displacement pulse when a remainder of the required amount of displacement is equal to or greater than a predetermined threshold value and for causing the stationary pulse to be produced when the remainder is less than the threshold value.

2. The piezoelectric-actuator control circuit according to claim 1, further comprising:
a step-width storage unit for storing an expected value of the step width, wherein
the control unit controls the production of the drive pulse continuously for a plurality of times within the servo control cycle, causes the displacement pulse to be produced and updates the remainder on the basis of the expected value when the remainder of the required amount of displacement is equal to or greater than the threshold value, and causes the stationary pulse to be continuously produced until the initiation of the next servo control cycle when the remainder is less than the threshold value.

3. The piezoelectric-actuator control circuit according to claim 1, wherein a duty ratio of the stationary pulse is 50%.

4. An image-stabilization control circuit comprising:
a vibration-compensation signal-generation unit for generating a vibration-compensation signal according to an amount of displacement of an image-capturing device on the basis of an output signal of a sensor for detecting vibration of the image-capturing device, the displacement being caused by the vibration;
a requisite displacement determining unit for calculating a required amount of displacement of an object of driving for each of predetermined servo control cycles, the object of driving being used to compensate for offset of a captured image caused by the vibration, and the required amount of displacement being calculated on the basis of the vibration-compensation signal and the output signal of the sensor for detecting a driving position of the object of driving; and
a piezoelectric actuator control circuit for using a piezoelectric actuator to control a displacement of the object of driving on the basis of the required amount of displacement, wherein
the piezoelectric actuator control circuit has:
a drive-pulse generation unit for selectively generating and outputting to the piezoelectric actuator a displacement pulse and a stationary pulse as a drive pulse for application to a piezoelectric element of the piezoelectric actuator, the displacement pulse having a duty ratio for causing the object of driving to be displaced by a predetermined step width, and the stationary pulse having a duty ratio for causing the object of driving to remain stationary in a current position; and a control unit for causing the drive-pulse generation unit to produce the displacement pulse when a remainder of the required amount of displacement is equal to or greater than a predetermined threshold value and for causing the stationary pulse to be produced when the remainder is less than the threshold value.

5. The image-stabilization control circuit according to claim 4, further comprising:

a step-width storage unit for storing an expected value of the step width, wherein the control unit controls the production of the drive pulse continuously for a plurality of times within the servo control cycle, causes the displacement pulse to be produced and updates the remainder on the basis of the expected value when the remainder of the required amount of displacement is equal to or greater than the threshold value, and causes the stationary pulse to be continuously produced until the initiation of the next servo control cycle when the remainder is less than the threshold value.

6. The image-stabilization control circuit according to claim 4, wherein a duty ratio of the stationary pulse is 50%.

* * * * *